United States Patent Office 3,038,338
Patented June 12, 1962

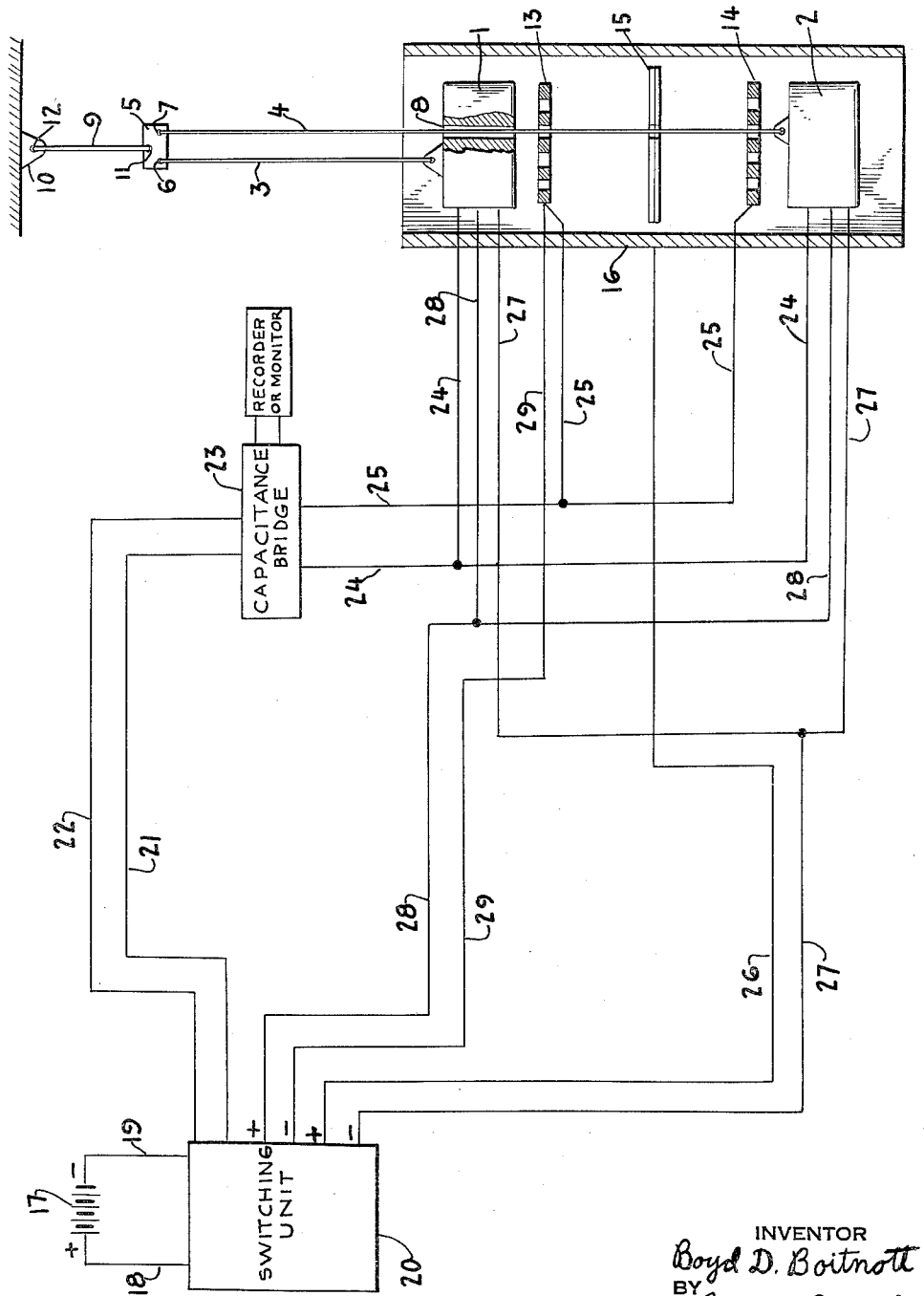

3,038,338
INSTRUMENT FOR AND METHOD OF AIRBORNE GRAVITATIONAL GEOPHYSICAL EXPLORATION
Boyd D. Boitnott, Rte. 1, Box 36, Fairbanks, Tex.
Filed Nov. 27, 1956, Ser. No. 624,623
15 Claims. (Cl. 73—382)

This invention relates to an instrument for and method of airborne gravitational geophysical exploration, and has for an object to provide an instrument designed and adapted automatically and continuously to detect and record variations in the gradient of the vertical component of the earth's gravity field, i.e., a derivative of the said field, while the instrument is airborne in flight over the terrain being explored; as well as method steps or procedure calculated and adequate to lead to the obtaining, with the use of the said instrument, of the desired significant information and data in the most efficient, expeditious and reliable manner devoid of opportunity for the intrusion of human error.

Another object is to provide such an instrument in which a plurality of masses of such nature as to be subject to the effect of the gravity field are supported one above the other in a manner which permits them to have vertical simultaneous relative movements under the influence of variations in the gradient of the vertical component of the gravity field.

Another object is to provide such an instrument which embodies a pair of like masses, and to construct and arrange the supporting means so that downward movement of the one mass is accompanied by corresponding upward movement of the other.

Another object is to provide such supporting means in which the masses are suspended from a common element by hinge pivots or the like, and in which the said common element is itself suspended from the instrument main support by a hinge pivot or the like, whereby the permitted relative movements of the masses are not impeded by friction.

Another object is to provide such an instrument in which the suspended masses are guarded against lateral displacement by the effect of the horizontal components of the gravity field.

Another object is to provide such an instrument which includes recording means for automatically recording graphically, or otherwise, or indicating momentarily to a human sense, the above mentioned relative movements of the masses.

Another object is to provide such recording means with sensitive members positioned in operative relationship with respect to the masses so that the movements of the latter causes them to exert greater or lesser influence upon the said members and correspondingly vary the output of the recording means.

Another object is to provide such an instrument which includes an electric circuit, supplied with voltage from a suitable source, embodying means for introducing dampening effects to slow down the natural cyclic vibratory period of the instrument and keep the same in proper balance; together with means for successively activating the recording means, the said dampening means, and the means for guarding the masses against the effect of the horizontal gravity components, at a rate of speed sufficiently high to cause the recording of the significant variations in gradient to be practically continuous.

Another object is to provide such an instrument by which the variations in the gradient of the vertical component of the earth's gravity field are automatically detected and reflected in usable form without the necessity of mathematical calculation; and without being influenced by local terrain conditions.

A further object is to provide certain improvements in the form, construction, arrangement and material of the several parts of the instrument, and in the steps of the method or procedure, whereby the above named objects and others inherent in the invention may be efficiently attained.

In brief summary, the invention comprehends the provision of an instrument of the character hereinabove indicated, which incorporates a pair of gravity responsive masses suspended in spaced vertical alignment so as to be differentially sensitive to the effect of changes in the gradient of the vertical component of the gravity field, the said masses being so interconnected that vertical movement of the one is accompanied by corresponding but opposite movement of the other. The movements of the masses obedient to variations in the said vertical gradient as the instrument traverses the air above the terrain are automatically translated into recordings by means, preferably electric, such as a capacitance bridge circuit supplied from a suitable source of voltage, and having its plates operatively associated with the masses so that the sum of the changes in distance between each mass and its associated plate imparts a proportional change in capacitance to the bridge which is at once reflected by the recorder, e.g., oscillograph, ear phones, or other suitable means. The instrument includes means to enable the masses to escape entirely the influence of the horizontal components of the gravity field, which desirably takes the form of an electrode surrounding the masses and connected into an electric circuit in such a way that the masses and the electrode are maintained at a constant difference in potential which serves to prevent lateral displacement of the masses. An electric circuit is also arranged to exert dampening effects through potential application to the masses and their plates for the purpose of slowing the natural cyclic periodicity of the instrument and keeping the same in proper balance; and competent switching means is provided for successively activating the capacitance bridge, the dampening means, and the electrode at a rate sufficient in speed to present a practically continuous recording of the significant variations in vertical gradient. A shield is interposed between the two masses, with their associated plates, to prevent undesired interference or interaction by the masses during the dampening periods; which shield should be composed of a substance having good electric conductivity but non-magnetic. The instrument excepting, if desired, the voltage source, is vertically stabilized in any well known and approved manner; e.g. gyroscopically, though free suspension is generally satisfactory. This eliminates displacements due principally to motions of the aircraft carrying the instrument which could hamper its precision.

A practical operative embodiment of the invention is diagrammatically represented in the accompanying drawing, to which reference will hereinafter be made in connection with the detailed description of construction and mode of operation.

It is thought that the subject matter of this application may be placed in better focus or perspective if its full portrayal be preceded by the following condensed recital touching the previously existing state of development in this field.

For a long time there has been a general understanding among geophysicists that anomalies in the earth's subsurface structure and substance are frequently indicative, directly or indirectly, of the existence and approximate location of valuable mineral deposits, such as oil, gas, and ores; and sometimes, indeed, of the actual size and character of the deposits themselves. This knowledge may be said to have constituted the basis of geophysical exploration, and one aspect of the significant anomalies involves gravitational conditions which are related to or reflective of variations in density. Accordingly, the professional practice of geophysical exploration has included, as one of its branches, measurement of the earth's gravity field, and/or one or more components thereof, and/or gradient changes therein. Various instruments have been devised and put to use in this connection, such as those of the pendulum and torsion balance type, as well as the gravimeter, all of which operate from fixed positions on the earth's surface.

It has been discovered and recognized that it is possible to ascertain the vertical gradient of gravity through successive measurements with a gravimeter placed at different elevations in a support positioned on the ground, and a modern presentation of this procedure, with its attendant difficulties in operation and uncertainties in results, together with recital of pertinent antecedent experiments, is found in an article by Stephen Thyssen-Bornemisza and W. F. Stackler, published in Geophysics, vol. XXI, pp. 771–779, July 1956. These authors note previous experimental work utilizing tripods and towers, but results were not satisfactory because vibrations set up in moving the gravimeter up and down, as well as gusts of wind, prevented attainment of precision. They mention a more recent experiment with a twelve foot tripod and gravimeter, the time required for measurement at each station being one hour and a half; and finally explain their latest activity in this direction which was carried on in 1955, the month of July being selected to take advantage of good weather conditions. The operation was conducted in a valley of known gravitational characteristics, and a tripod was used of sufficient height to permit change in gravimeter elevation of about twelve feet. It was found that the operator could not touch the instrument or the tripod when making observations, so that an elevated platform or ladder was provided for him. The time required for measurement at each station was finally reduced to from ten to fifteen minutes. It was necessary to take advantage of relatively calm wind periods and to control instrument drift. Observations were made at eleven stations spaced one-half mile apart. The writers conclude that the experiment showed it to be possible thus to make practical vertical gravity gradient measurements "when proper care is taken," but add that the theoretical and practical implications resulting from the experiment cannot be appraised completely as more experiments are obviously necessary before final judgment of the practicability of their procedure. The article fails to state the total elapsed time required for the observations, but it is evident that the transport to and setting up of the apparatus at each half mile station must have involved extended delays.

The factor of topography is one that with great frequency intrudes upon exploration conducted on the earth's surface, and such features as dense forests, heavy undergrowth, marshland, streams, and rough hills, among many, can present almost insuperable barriers to practical operations, or, at least, involve great delays and expense. An attempt to escape these impediments was made by C. A. Heiland, as disclosed in U.S. Patent No. 2,626,525, issued January 27, 1953. He proposed to make gravimetric investigations of areas "regardless of the character of the surface topography" and to detect gravitational anomalies "in regions which would otherwise be inaccessible, such as swamps, jungles and the like." The plan was to carry a gravimeter to desired points by helicopter or blimp and lower the instrument by cable to the ground. The instrument was supported in a skeleton tripod fitted with spikes and was sufficient in weight so that the spikes entered the earth and held the instrument in position while also serving as an anchor for the aircraft. Means for automatic leveling and dial reading of the gravity measurement were embodied in the apparatus "so that, when the instrument is subsequently hoisted back onto the aircraft, that reading may be taken off by the observer." It is pointed out in the patent that the gravity reading would be without value unless means were provided for determining accurately the elevation of the station, and two forms of such means are suggested, one telescopic and "somewhat complicated," and the other "less accurate but more rapid," involving the use of radio transmitters at two or more ground stations. Gravity measurements thus achieved are repeated "at desired places" in the area being explored, the instrument being transported by air from station to station and the measurements being taken on the ground. The patent does not explain how topographic hindrances to the lowering of the instrument to the earth, e.g. dense forests or other vegetable growth; or difficulties in ground support and leveling of the instrument, e.g. swamps and rocks; are overcome.

In the gravity field vector the horizontal and vertical components are very unequal, the latter, in fact, being almost equal to the total vector; and it has become an accepted fact that gradient measurements, as distinguished from absolute measurements, and, particularly vertical gradient measurements, afford the more significant data with respect to the pursuit of geophysical exploration for mineral deposits. The vertical gradient is the first derivative of the field in a vertical direction, and equations expressive of this derivative as well as of the second derivative are familiar to those engaged in this professional activity. The said derivatives, emphatically, have the inherent virtue of readily providing detailed information of value but, up to the present, it has been necessary to compute the said derivatives from data obtained by direct observations conducted on the ground by well known instruments for measuring gravity, such as the torsion balance, pendulum, or gravimeter hereinabove mentioned. This procedure involves not only the cumbersome and time consuming work previously explained, but also extensive mathematical calculations that are inevitably vulnerable to human error; while the equations and formulae which have been established for use in the calculations are recognized as merely approximate.

An informative and reasonably up-to-date exposition of the foregoing state of progress is presented in an article by Thomas A. Elkins, published by Geophysics, vol. XVI, pp. 29–50, in January 1951. The author notes the "clearer and better resolved picture" which may be obtained through second derivative computation from measurements by known instruments, and sets forth a large number of equations and formulae for the necessary mathematical and graphical computation. "Sources of error" in the graphical method of computation are explained, one of which is said to be "fundamental." As to the numerical coefficient method, it is observed that the relative merits of the large number of coefficient sets available "can be determined only by testing them" to find out whether or not the "approximations involved in the derivation of the formula and the use of a grid cause too great inaccuracy," and whether "the errors in practical data cause too much disturbance." The conclusion reached is that "second derivative values found either graphically or by coefficients are necessarily approximate"; and the balance of the article is devoted to practical illustrations of "the greater resolution obtainable with the second derivative than with gravity."

Three years after the article to which reference has just been made, Otto Rosenbach presented a discussion of the merit of the second derivative of the vertical gradient in Geophysical Prospecting, vol. II, No. 1, pp. 1–23, March 1954, and the abstract at the front of his article explains that "The calculation of the second derivative is carried out by means of three approximation formulae"; while in the June 1954 issue of the same magazine, pp. 128–138, this scientist again adverts to the interpretative potentialties of second derivative quantities but cautions by reminding that "these quantities have been computed from gravity values by means of formulae of approximation."

As a final reference to the literature, an exposition by Herman A. Ackerman and C. Hewitt Dix may be signalled. This appeared in January, 1955 (Geophysics, vol. XX, No. 1, pp. 148–154) and was a consideration of formulae for calculating the first vertical derivative of gravity in terms of the distribution of the second vertical derivative, in connection with which the authors observed that "with regard to the question of errors the uncertainty in the second derivative is often rather severe."

It is believed that these summaries of and excerpts from the writings of scientists of elevated standing in this profession, presented during the past five years, are adequate to establish the facts that, as asserted in an earlier part of this specification, derivatives of the vertical component of the gravity field, i.e. functions of the vertical gradient of the said component, are significantly informative of gravity measurements with respect to geophysical exploration for mineral deposits in the earth; but that the said derivatives have heretofore been determined only by cumbersome and slow procedure on the ground or by mathematical calculation from instrumental gravity measurements, which calculations have been not only extensive and subject to human error, but have also been founded on "approximate" formulae. Vis-a-vis this background of previous advance, the present invention contributes, in simple apparatus and method forms, means for automatically detecting and continuously concurrently recording the variations in the gradient of the vertical component of the earth's gravity field, i.e. a derivative of the said field; the said detecting and recording being accomplished while the apparatus is airflown over the area under investigation for mineral deposits and thus escaping entirely local terrain conditions. The need for absolute measurements or determinations is eliminated; the effects of the horizontal components of the gravity field are avoided; the critical significant portions of the derivative of the gradient are mapped; and the whole procedure is so characterized by expedition that, for instance, seventy-five square miles of territory can be explored and mapped in approximately one hour, which is out of all reasonable comparison with the capability or adaptability of hitherto known procedures.

Referring now to the apparatus embodiment of the invention diagrammatically represented in the accompanying drawing, the instrument incorporates a pair of like masses denoted by 1 and 2. They are composed of a substance possessed of good electric conductivity but which is non-magnetic or, at least, para-magnetic, and non-corrosive. Precious metals, such as gold and silver have been found to be eminently satisfactory. Although referred to as "masses," these elements need not be large, even less than a gram in weight sufficing for functional precision of the instrument. The masses are freely suspended in vertically spaced relationship, as by fine copper wires 3, 4, from a common head piece 5, the connections therewith being in the nature of hinge pivots 6, 7, to promote frictionless attachment. The mass 1 is pierced, as indicated at 8, for the free passage therethrough of wire 4, thus permitting precise vertical alignment of the masses. Otherwise, the two masses are identical, and they are identical in normal weight. The head piece 5 is, itself, suspended at a point between the hinge pivots 6, 7, as by a copper wire 9, from the instrument carrying means 10, which may be the top of a cabinet, or the like, (not shown), the connections 11, 12, of the wire 9 being also by hinge pivots or the like.

Fixedly mounted in any suitable manner between the masses 1, 2, are the plates 13, 14, of a capacitance bridge circuit (to be hereinafter described), the plate 13 being adjacent mass 1. Likewise fixedly mounted is a shield 15, non-magnetic in character but having good electric conductivity, which is interposed between plates 13, 14, to prevent undesired interference or interaction by the masses 1, 2. This shield, and the head piece 5, may conveniently be composed of copper or brass. A tubular electrode 16, of any suitable non-magnetic but electrical conductive metal, e.g. copper, embraces the masses 1, 2; the plates 13, 14; and the shield 15, the purpose of the electrode being to eliminate effects upon the masses of the horizontal components of the earth's gravity field, as will be later explained.

Means (not shown) is provided for vertically stabilizing the combined masses, their associated plates, the shield, and the electrode, which means may appropriately be gyroscopic, although other well known forms may be substituted; and free suspension is usually adequate. Engineers are so familiar with various kinds of such stabilizing means that neither detailed description nor illustration is deemed to be required.

The capacitance bridge circuit heretofore mentioned constitutes part of an electric control system for the instrument which has three functions, and the bridge circuit with its function will now be set forth.

Any appropriate source of electric voltage, here shown as a battery 17, has its poles connected by wires 18, 19, with a switching unit 20, which may be conventional and of either mechanical or electrical type, requiring no description. From proper connections in the unit 20 wires 21, 22, lead to the capacitance bridge 23, and from terminals of the latter wires 24, 25, extend through branches similarly marked, to the masses 1, 2, and their plates 13, 14, respectively. In the drawing the wires are shown as connected directly to the masses but, in practice, the connections are indirect, as through the supporting means for the masses. The output of the bridge is in electrical connection with a recorder of adequate and appropriate kind, a number of which are well known and easily available. Graphic recording as by oscillograph, or tape recording, are preferred, but monitoring through ear phones can be substituted, if desired.

In operation, as the instrument is flown by aircraft over terrain being explored, the two masses 1 and 2 will be subject to the force of the vertical component of the earth's gravity field by the strength of the gravity effect on the masses will differ owing to their vertical spacing. The spacing need not be great. Less than one foot suffices.

When the instrument passes over a gravitational anomaly in density the result will be to, in effect, differentially change the weights of the masses because of their difference in distance from the locus of the anomaly and the lower mass 2 will either rise or fall with corresponding opposite movement of the upper mass 1. This will move both masses either closer to or further from the bridge circuit plates 14 and 13, with an ensuing change in the capacitance factor; the sum of the change in distance between each of the masses and its associated plate serving to impart a porportional change in capacitance to the bridge 23, which instantly causes the change to be reflected in the recording means. The said movements of the masses are so slight as not to be visible, but they are fully adequate in function.

As previously indicated, the embracing electrode 16 acts to eliminate effects of the horizontal components of the gravity field, and, in order to adapt it to this purpose, the switching unit 20 periodically connects the voltage source 17 with the electrode and with both masses 1 and 2, by positive and negative wires 26 and 27, respectively; the wire 27 being extended into branches similarly marked which make the contact with the masses. As mentioned above when referring to wire 24, the contact with the masses, though shown as direct, is actually through their supporting means. By maintaining the electric potentials of the two masses constant, and the potential of the electrmode constant, with a difference between the said potentials, lateral displacements of the masses are avoided, thus escaping the force of the horizontal gravity components.

The control system of the instrument also comprises means for insuring proper balance of the bridge circuit by reducing the normally high natural rate of cyclic periods of oscillation or vibration, which result is accomplished by a dampening arrangement that operates through the application of electronic potentials to the masses 1, 2, and their cooperating plates 13, 14. To this end voltage from source 17 is directed to positive and negative wires 28, 29, by switching unit 20, the positive wire 28 having two similarly numbered branches which lead to the mass 1, and the mass 2, while the negative wire 29 leads to the plate 13. Here, again, the connections to the masses are through their supports. The shield 15 assists in the balancing by preventing interference or interaction between the two masses. When the system is in proper balance, the signal of the recording device will be zero or null.

The switching unit 20 is designed and adjusted to activate successively the capacitance bridge circuit, the dampening circuit, and the embracing electrode circuit, at a rate sufficiently high to cause the recording of the gradient of the vertical component of the gravity field to be substantially continuous.

Turning now to a general recital of the method of use of the instrument; it is mounted or supported in or on or carried by an aircraft in such manner as to be automatically vertically stabilized against all motions of the craft including changes in speed. The particular type of craft is not of controlling importance, but a comparatively slow flying airplane has been found to meet all requirements. The terrain selected for exploration is traversed by the plane in fairly closely spaced (e.g. five hundred feet to one half mile) approximately parallel flights at a chosen altitude (e.g. five hundred to three thousand feet), generally followed by similar flights at substantially right angles to those previously made, preferably north-south flights followed by east-west. The variations in the gradient of the vertical component (i.e. a derivative) of the earth's gravity field detected by the instrument during the flights are either continuously recorded, e.g. graphically, or on tape, or carefully monitored with appropriate notations. Correlation of the recordings with the terrain from which the signals are received should, of course, be accurately maintained in any preferred manner (e.g. photographic, by radio, or otherwise), several being now well understood by those experienced in magnetic aerial geophysical exploration. By plotting the records thus obtained, a pattern of the significant vertical gravity component gradient variations is developed which may be interpreted directly within the skill of geophysicists.

This instrument will perform with satisfaction when airborne even under fairly turbulent conditions, which may be defined as thrust force not greater than one and one quarter times the normal gravitational force; and in the event that the turbulence exceeds the operative tolerance of the instrument, the fact will at once become known to the operator so that he may obviate continuance of unreliable recording. Furthermore, such excessive turbulence will have no injurious effect upon the instrument. Neither does acceleration in any direction, provided the acceleration remains constant, hamper the performance of the instrument since the forces due to acceleration act equally upon both masses and they retain their relative spacing regardless of altitude, while the timing of the instrument functions by the electrical control system cancels out the effect of occasional momentary "bumps," or the like.

While its complete adaptability to aerial exploration is an outstanding characteristic feature of this instrument, the fact should also be made clear that it is likewise well suited to ground operations in which the previously explained inherent advantages, as compared with prior developments (e.g. elimination of mathematical calculations), would be of meritorious importance. Accordingly, some claims are presented directed to the instrument itself, without reference to a particular type of gravitational exploration.

It is desired to be understood that various changes may be made in the form, construction, arrangement and materials of the several parts of the instrument, and in the steps of the method followed in its use, without departing from the spirit and scope of the invention; and, hence, I do not intend to be limited to details herein shown or described except as the same way may be included in the claims or be required by disclosures of the prior art.

What I claim is:

1. An instrument designed and adapted for airborne gravitational geophysical exploration, said instrument comprising, a plurality of gravity responsive masses, and means for interconnecting and supporting the masses for opposite relative vertical movements, said means including a common element from which the masses are suspended in spaced vertical alignment and a support for the said common element freely attached thereto at a point between the points of suspension of the masses, said interconnecting and supporting means being so constructed and arranged as to cause corresponding opposite vertical movements of the masses under the differential influence of gravity upon each mass due to their vertical spacing.

2. An instrument as defined in claim 1, which includes an electric control system operatively connected with the masses and has cyclic vibratory periodicity in operation, and in which the control system includes means for simultaneously recording a functional effect of the opposite relative movements of the masses, means for dampening the normal vibratory rate of the instrument to balance the same, means for preventing lateral displacement of the masses by the effect of the horizontal components of the gravity field, and means for successively activating the said recording means, the said dampening means, and the said means for preventing lateral displacement of the masses.

3. A gravity gradiometer for geophysical exploration comprising, means for detecting variations in the gradient of the vertical component of the earth's gravity field, said means including a plurality of vertically aligned and spaced gravity responsive masses, and means for interconnecting and vertically relatively movably supporting the masses, said last named means comprising a common element from which the masses are suspended and a support for the said common element freely attached thereto at a point between the points of suspension of the masses, said interconnecting and supporting means being so constructed and arranged as to cause corresponding opposite vertical movements of the masses under the differential influence of said gradient variations upon each mass due to their vertical spacing, and means operatively connected with the masses for recording the said variations in the vertical component as detected.

4. An instrument as defined in claim 3, which has cyclic periodicity in operation, and includes means for regulating the periodicity timing.

5. An instrument as defined in claim 4, in which the means for regulating the periodicity timing comprises an electric control system in operative connection with the masses.

6. An instrument as defined in claim 5, which also includes an electrode in operative relation to the masses and connected with the electric control system for preventing lateral displacement of the masses by the effect of the horizontal components of the gravity field.

7. An instrument as defined in claim 6, in which the electric control system includes means for recording a functional effect of the relative movements of the masses, and the recording means has at least one sensitive element in cooperative relation with at least one of the masses.

8. An instrument as defined in claim 7, in which there is a pair of masses and a pair of said sensitive elements, one of the latter in cooperative relation with each of the masses.

9. An instrument as defined in claim 8, which also includes a shield interposed between the masses to prevent unbalancing mutual interference or interaction by the masses.

10. An instrument as defined in claim 9, in which the masses, the sensitive elements, and the shield are all in vertical alignment.

11. An instrument as defined in claim 10, in which the electrode embraces the masses, the sensitive elements and the shield.

12. An instrument as defined in claim 1, which also includes operatively connected means for simultaneously recording a functional effect of the said relative movements of the masses, the said recording means including an electric control system embodying a capacitance bridge circuit having its sensitive plates positioned vertically adjacent the masses for causing the said movements of the masses to produce changes in the capacitance factor, and a recording device in electrical connection with the output of the capacitance bridge.

13. An instrument as defined in claim 12, in which there is a pair of masses substantially identical in weight and electric characteristics in electrical connection with the control system, and in which the plates of the bridge circuit are positioned between the masses, the parts being so constructed and arranged that the vertical opposite movements of the masses bring both masses either closer to or further from the said plates and the sum of the change in distance between each mass and its adjacent plate imparts a proportional change in capacitance to the bridge.

14. An instrument as defined in claim 13, which also includes an electrode embracing the masses and the plates, which electrode is in electrical connection with the control system, and the said system is constructed and arranged to maintain the potentials of the pair of masses constant and the potential of the electrode constant, with a difference between the said two potentials for eliminating the effect of the horizontal components of the gravity field.

15. An instrument as defined in claim 14, which has cyclic vibratory periodicity in operation, and in which the electric control system is connected with the masses and the plates of the capacitance circuit and constructed and arranged to apply positive potentials to the masses and negative potential to one plate of the bridge circuit, for dampening the normally high rate of periods of vibration and insuring proper balance of the instrument.

References Cited in the file of this patent

UNITED STATES PATENTS

| | | |
|---|---|---|
| 1,652,255 | Schweydar | Dec. 13, 1927 |
| 1,684,229 | Koenigsberger | Sept. 11, 1928 |
| 2,316,915 | Truman | Apr. 20, 1943 |
| 2,322,681 | Zenor | June 22, 1943 |
| 2,618,156 | Boucher | Nov. 18, 1952 |
| 2,809,524 | Masterson | Oct. 15, 1957 |

FOREIGN PATENTS

| | | |
|---|---|---|
| 448,003 | Germany | Aug. 6, 1927 |
| 571,613 | Great Britain | Aug. 31, 1945 |